(12) United States Patent
Crean, III et al.

(10) Patent No.: US 11,229,187 B2
(45) Date of Patent: Jan. 25, 2022

(54) INTEGRATED MODULAR BELT AND MOLD

(71) Applicant: SONOMA CREAMERY, LLC, Sonoma, CA (US)

(72) Inventors: John E. Crean, III, Sonoma, CA (US); Louis J. Biaggi, Sonoma, CA (US); Dana D. Smith, Sonoma, CA (US); Patrick L. Costello, Fairfield, CA (US); Francisco X. Aguirre, Vallejo, CA (US)

(73) Assignee: SONOMA CREAMERY, LLC, Sonoma, CA (US)

( * ) Notice: Subject to any disclaimer, the term of this patent is extended or adjusted under 35 U.S.C. 154(b) by 0 days.

(21) Appl. No.: 16/881,368

(22) Filed: May 22, 2020

(65) Prior Publication Data
US 2021/0360893 A1 Nov. 25, 2021

(51) Int. Cl.
| | | |
|---|---|---|
| *A47J 37/12* | (2006.01) | |
| *A01J 25/12* | (2006.01) | |
| *A01J 25/13* | (2006.01) | |
| *A23C 19/00* | (2006.01) | |

(52) U.S. Cl.
CPC ............. *A01J 25/123* (2013.01); *A01J 25/13* (2013.01); *A23C 19/00* (2013.01)

(58) Field of Classification Search
CPC .......... A01J 25/123; A01J 25/13; A23C 19/00
USPC .......................................................... 426/512
See application file for complete search history.

(56) References Cited

U.S. PATENT DOCUMENTS

| | | | | | |
|---|---|---|---|---|---|
| 3,520,398 | A | * | 7/1970 | Thomson ............. | B65G 17/086 198/852 |
| 6,129,939 | A | * | 10/2000 | Fink ......................... | A21B 5/08 426/438 |

FOREIGN PATENT DOCUMENTS

CN        103269623 A  *  8/2013  ............. A47J 36/02

OTHER PUBLICATIONS

CN-103269623-A translation (Year: 2013).*

* cited by examiner

*Primary Examiner* — Brent T O'Hern
(74) *Attorney, Agent, or Firm* — Pauley Erickson & Swanson

(57) ABSTRACT

A method and apparatus for forming food product includes a plurality of links forming a generally continuous conveyor, the plurality of links each forming at least one cavity together with a longitudinally adjacent link wherein the longitudinally adjacent link includes a pivotable tongue that pivots through the cavity as the generally continuous conveyor reaches an end of its horizontal path.

15 Claims, 3 Drawing Sheets

INTEGRATED MODULAR BELT AND MOLD

BACKGROUND OF THE INVENTION

Field of the Invention

This invention relates to an integrated and modular belt and mold particularly suited for forming food products.

Description of Prior Art

Prior art methods of forming food products, in particular cheese snacks, involve lightweight reusable and disposable molds that are filled with ingredients including cheese, seasoning, grains, water and/or desired occlusions and passed through an oven to bake. Following baking, the individual molds are hot and must be emptied, typically by hand, thus exposing workers to high temperatures and significant effort to ensure each mold is properly emptied and returned to a filling station. Such molds are typically used for a limited number of cycles and then must be discarded and replaced.

A need therefore exists for a reusable, high-cycle, temperature resistant method and apparatus for forming food products that is not susceptible to the disadvantages of the prior art.

SUMMARY OF THE INVENTION

The present invention is directed to an integrated modular belt and mold system. The subject invention replaces and obviates the need for piecemeal disposable plastic molds which are not interlocked. The replacement of these molds with the subject invention eliminates and/or ameliorates numerous disadvantages and/or inefficiencies inherent in the disposable plastic molds.

Production inefficiencies created by lower production yields and higher waste are eliminated by the subject invention. The subject invention reduces failure or difficulties in releasing product from cavities following cooking. In addition, subject invention improves production speed limitations Further, investment inefficiencies are resolved by the subject invention including improved wear resistance resulting in less frequent replacement than the use of disposable molds, thereby saving costs of replacement. Labor inefficiencies are also resolved by the subject invention because fewer employees are required for production than with the traditional loading and de-panning of disposable molds.

Finally, production inconsistencies that occurred in the prior art methods, including greater than acceptable variations in size and shape of finished goods baked pieces, are eliminated or reduced. Likewise, food safety issues are reduced including the potential for more frequent introduction of foreign material into finished goods through a manual process. The above and other shortcomings are preferably eliminated or mitigated by the subject invention as described below.

The subject apparatus for forming food products preferably includes a plurality of links forming a generally continuous conveyor. The plurality of links each form at least one cavity together with a longitudinally adjacent link. The longitudinally adjacent link preferably includes a pivotable tongue that pivots through the cavity as the generally continuous conveyor reaches an end of its horizontal path.

A corresponding method for forming food products preferably includes providing a filling station where raw food product is loaded onto the conveyor. The conveyor includes the plurality of links forming a corresponding plurality of cavities. Each cavity is filled at the filling station and the conveyor is subsequently conveyed through a heating zone. Following heating and/or baking, the heated food product is discharged from the conveyor through an interference between a longitudinally adjacent link with at least one cavity.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
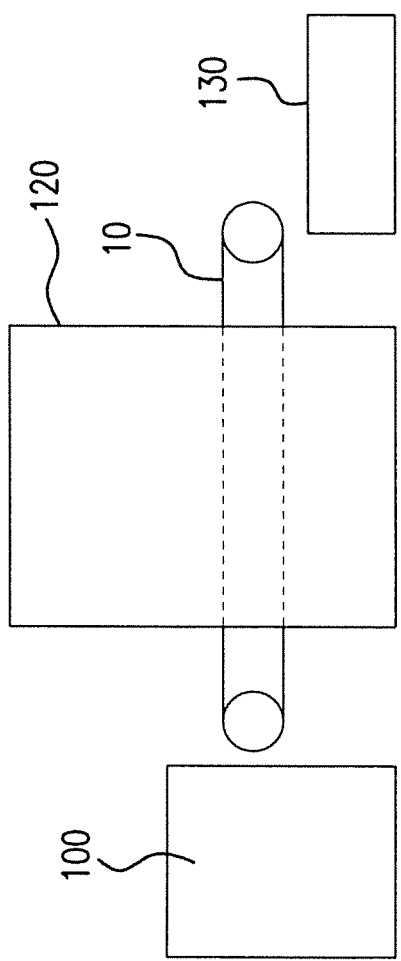
FIG. 1 is a schematic of a system for making food product according to one preferred embodiment of this invention.

FIGS. 1-5 show various preferred embodiments for an integrated modular belt and mold used for forming food products, in particular cheese-based snacks. FIG. 1 shows a schematic of a system and apparatus for forming food product according to one preferred embodiment of the invention.

A system as shown and described schematically in FIG. 1 may include a filling station 100 where ingredients are mobilized for placement in desired proportions onto a generally continuous or continuous conveyor 10 (described below). The conveyor 10 then proceeds through an oven 120 for melting, baking, cooking and/or conditioning the food product. In one preferred embodiment, the oven 120 may comprise a large scale oven or baking apparatus. A convection oven, broiler, infrared, microwave or other oven type 120 may be alternately used in appropriate applications.

Following a cooking step, the conveyor 10 reaches an end of its linear path and deposits the cooked food product at a discharge station 130, as described in more detail below. Once the cooked food product is ejected from the conveyor 10 at the discharge station 130, the conveyor 10 proceeds around the conveyor path to travel back toward the filling station 100 for another batch in a preferably generally continuous process.

Figure 2:
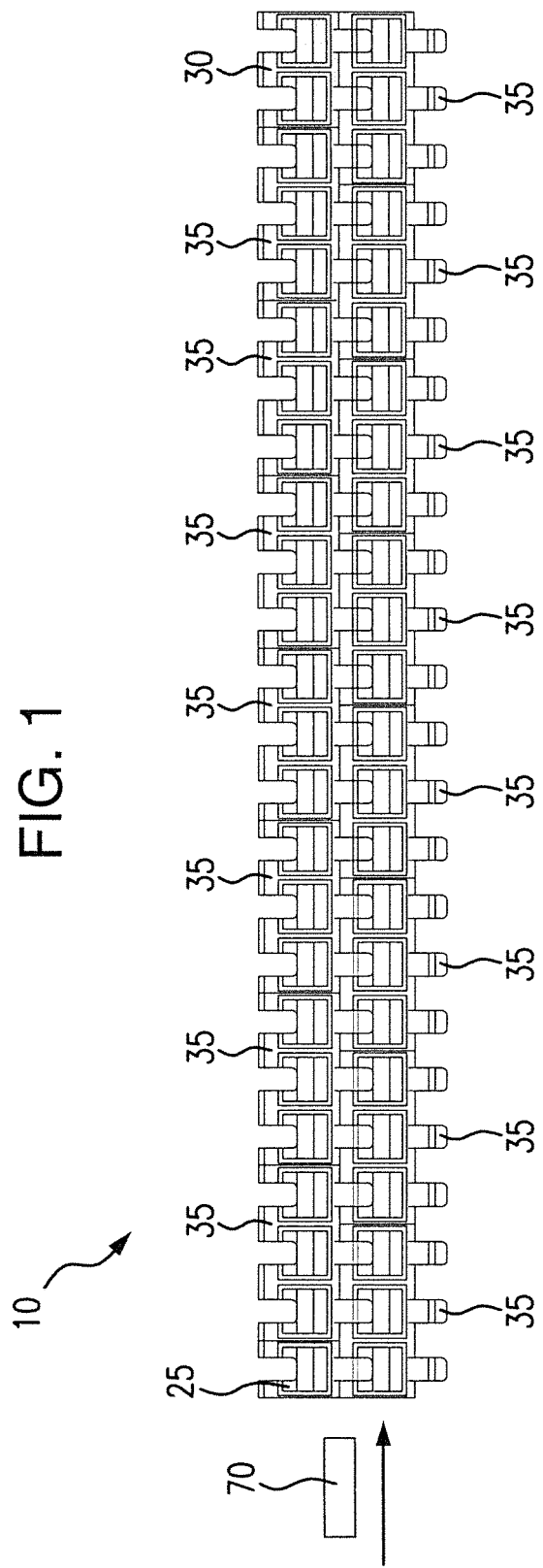
FIG. 2 is a plan view of a portion of a conveyor according to one preferred embodiment of this invention.

FIG. 2 shows a representative segment of the conveyor 10 formed by a plurality of links 20. The plurality of links 20 are preferably arranged in longitudinal columns and transverse rows in a desired array so as to form a conveyor 10 having a sufficient width and length for the processing operation. As shown, the desired conveyor 10 includes a plurality of cavities 40 for forming food product which are filled with the desired food product at the filling station 100.

The conveyor 10 may be direct driven by a drove motor, a drive shaft, gears, wheels, and/or similar drive system or may travel on a drive belt roughly corresponding in size and length to the conveyor 10. A preferred embodiment of this invention minimizes the additional necessary drive components required in connection with the conveyor 10 to promote sanitization and cleaning of the conveyor 10 and cavities 40 at necessary intervals. Alternatively, the conveyor 10 may be removed and replaced during shifts to run somewhat continuously and enable separate cleaning of the off-shift conveyor 10.

Figure 3:
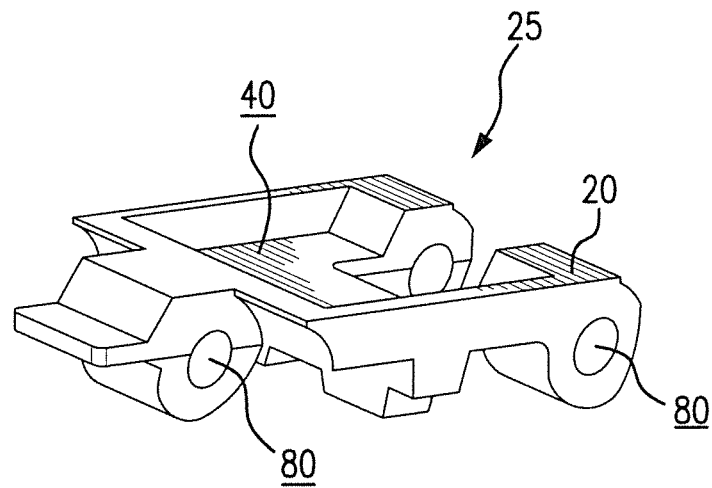
FIG. 3 is a side perspective view of a single link according to one preferred embodiment of this invention.
Figure 4:
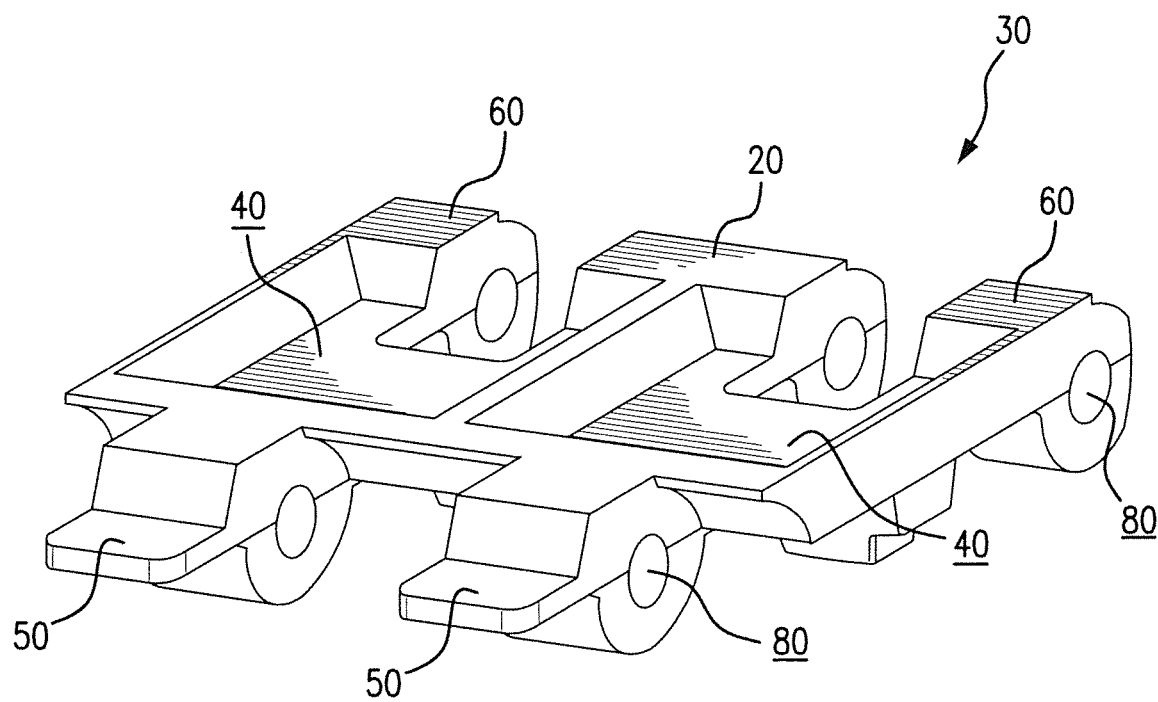
FIG. 4 is a front perspective view of a double link according to one preferred embodiment of this invention.
Figure 5:
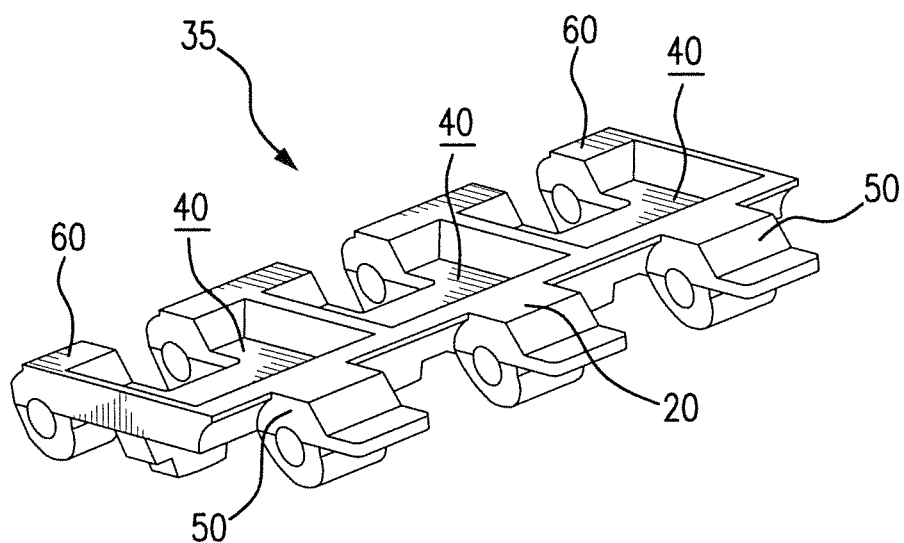
FIG. 5 is a front perspective view of a triple link according to one preferred embodiment of this invention.

As further shown in FIGS. 3-5, the plurality of links 20 may comprise a plurality of single links 25, a plurality of double links 30 and a plurality of triple links 35. Although different groupings of links 20 are desirable as explained in more detail below, the groupings may include four, five or even more sets of links, depending on the application.

The plurality of links 20 each form at least one cavity 40 together with a portion of a longitudinally adjacent link. Each link 20 includes a pivotable tongue 50 and an opposite knuckle 60 that mates with the tongue 50 of a longitudinally adjacent link 20. In operation, the pivotable tongue 50 preferably pivots through the cavity 40 as the generally continuous conveyor reaches an end of its horizontal path.

As best shown in FIG. 2, longitudinally adjacent links 20 are offset relative to each other while rows of adjacent links 20 are aligned. This longitudinal offset arrangement prevents the conveyor 10 from "walking" laterally across a conveyor path and therefore maintains a linear and predictable direction of the conveyor 10. In addition, a different arrangement of links are included in each progressive longitudinally adjacent row of links 20 to assist in proper tracking of the conveyor 20. A preferred embodiment of the conveyor 10 therefore requires aligning each row of links and offsetting each column of adjacent links so that no entire link is longitudinally adjacent an entire identical link within a column.

In one preferred embodiment of the invention, every other row of links 20 includes only triple links 35. Alternating rows are preferably assembled with alternate combinations of links, such as single, triple, triple, triple, triple, triple, triple, triple, double. In this manner, each longitudinally adjacent link is a different configuration than an adjacent link.

According to a preferred embodiment the links 20, and indeed the entire conveyor 10, is formed of polyether ether ketone (PEEK). Although PEEK is preferable for this application, other polymers having a high smoke point and desired durability and food safe properties may be used.

Each cavity 40 is preferably formed in a surface of each link 20. More specifically, each cavity 40 is mostly formed in one link 20 and completed between two longitudinally adjacent links 20.

Each link 20 comprises at least one tongue 50 along one longitudinal edge and at least two knuckles 60 on an opposite longitudinal edge. The at least two knuckles form a gap within which a tongue 50 from a longitudinally adjacent link 20 is fitted. In addition, a transverse bore 80 is formed through the tongue 50 and an opposite knuckle 60 of a longitudinally adjacent link 20. A pin 70 may then be fitted through the bore 80 to join rows of links 20 in the conveyor 10.

A corresponding method for forming food products comprises providing a filling station 100 and a downstream conveyor 10, wherein the conveyor 10 includes a plurality of links 20, each link forming at least one cavity. Food product is preferably generally continuously filled in each cavity 40 at the filling station 100. The conveyor 10 is accordingly extended through a heating zone. Finally, heated/prepared food product is discharged from each cavity 40 of the conveyor 10 through an interference between a portion of a longitudinally adjacent link 20 with the at least one cavity 40.

The heating zone, as described above, such as a commercial microwave oven or large scale baking apparatus, is maintained at approximately 180 to 400 degrees F. and more preferably 240 to 260 degrees F. depending on the application. In a preferred embodiment of this invention, the primary ingredient of the food product comprises cheese. Alternative food products having a suitable melt point, cooking requirements and taste characteristics may also be used.

While in the foregoing specification this invention has been described in relation to certain preferred embodiments thereof, and many details have been set forth for purpose of illustration, it will be apparent to those skilled in the art that the method and apparatus herein are susceptible to additional embodiments and that certain of the details described herein can be varied considerably without departing from the basic principles of the invention.

The invention claimed is:

1. An apparatus for forming a food product comprising: a plurality of links forming a continuous conveyor, the plurality of links each forming at least one cavity together with a longitudinally adjacent link wherein the longitudinally adjacent link includes a pivotable tongue that pivots through the at least one cavity to eject the food product as the generally continuous conveyor reaches an end of its horizontal path.

2. The apparatus of claim 1 wherein the plurality of links comprise a plurality of single links, a plurality of double links and a plurality of triple links.

3. The apparatus of claim 2 wherein longitudinally adjacent links are offset relative to each other.

4. The apparatus of claim 1 wherein each row of links includes a different arrangement of links than a longitudinally adjacent row.

5. The apparatus of claim 1 wherein every other row of links includes only triple links.

6. The apparatus of claim 1 wherein the plurality of links are formed of polyether ether ketone.

7. The apparatus of claim 1 further comprising an oven through which the continuous conveyor extends.

8. The apparatus of claim 1 wherein the at least one cavity is formed in a surface of each link.

9. The apparatus of claim 8 wherein the cavity is completed between two longitudinally adjacent links.

10. The apparatus of claim 1 wherein each link comprises at least one tongue along one longitudinal edge and at least two knuckles on an opposite longitudinal edge, the at least two knuckles forming a gap within which a tongue from a longitudinally adjacent link is fitted.

11. The apparatus of claim 1 wherein each link includes a tongue and an opposite knuckle through which a transverse bore is formed.

12. The apparatus of claim 1 wherein the continuous conveyor is formed with respect to a drive motor or shaft.

13. An apparatus for forming a food product comprising: a plurality of links forming a continuous conveyor, wherein the plurality of links comprise a plurality of single links, a plurality of double links and a plurality of triple links, the plurality of links each forming at least one cavity together with a longitudinally adjacent link wherein the longitudinally adjacent link includes a pivotable tongue that pivots through the cavity as the generally continuous conveyor reaches an end of its horizontal path.

14. An apparatus for forming a food product comprising: a plurality of links forming a continuous conveyor, wherein each row of links includes a different arrangement of links than a longitudinally adjacent row, the plurality of links each forming at least one cavity together with a longitudinally adjacent link wherein the longitudinally adjacent link includes a pivotable tongue that pivots through the cavity as the generally continuous conveyor reaches an end of its horizontal path.

15. An apparatus for forming a food product comprising: a plurality of links forming a continuous conveyor, wherein the plurality of links at partially includes triple links and every other row of links includes only triple links, the plurality of links each forming at least one cavity together with a longitudinally adjacent link wherein the longitudinally adjacent link includes a pivotable tongue that pivots through the cavity as the generally continuous conveyor reaches an end of its horizontal path.

* * * * *